(12) United States Patent
Tzoref-Brill

(10) Patent No.: US 8,813,036 B2
(45) Date of Patent: Aug. 19, 2014

(54) VISUAL REPRESENTATION OF A DIFFERENCE BETWEEN CARTESIAN PRODUCT MODELS

(75) Inventor: Rachel Tzoref-Brill, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 13/448,420

(22) Filed: Apr. 17, 2012

(65) Prior Publication Data
US 2013/0275939 A1 Oct. 17, 2013

(51) Int. Cl.
G06F 9/45 (2006.01)

(52) U.S. Cl.
USPC .............................. 717/124; 717/127; 717/131

(58) Field of Classification Search
None
See application file for complete search history.

(56) References Cited

U.S. PATENT DOCUMENTS

| 6,163,876 A * | 12/2000 | Ashar et al. ................... 716/107 |
| 2008/0270865 A1 | 10/2008 | Bhinge |
| 2010/0058295 A1 * | 3/2010 | Johnson et al. ............... 717/124 |

* cited by examiner

*Primary Examiner* — Chuck Kendall

(57) ABSTRACT

A method, apparatus, and product for assisting in the use of functional models. The method comprises obtaining two or more functional models comprising variables, domains and restrictions, the two or more functional models defining a test-space comprising legal tasks; determining a difference between the test-spaces defined by the two or more functional models, wherein the difference comprises at least one task which is covered by one functional model and not the other; and displaying to a user a visual representation of the difference.

24 Claims, 4 Drawing Sheets

VISUAL REPRESENTATION OF A DIFFERENCE BETWEEN CARTESIAN PRODUCT MODELS

TECHNICAL FIELD

The present disclosure relates to functional modeling in general, and to providing a visual indication of differences between functional models, in particular.

BACKGROUND

Omissions are a major risk in testing. Test planning and functional coverage analysis techniques are well known ways to reduce omissions and increase the quality of testing. Test planning tries to prevent omissions in advance (i.e., before tests are implemented and executed) by selecting what to test out of a possibly enormous test space, in a way that reduces as much as possible the risk of bugs escaping to the field. Functional coverage analysis points to gaps in coverage of existing tests or test plans.

Both Test planning and functional coverage analysis require modeling of the test space. The test space can represent inputs, scenarios, configurations, the application's internal state, or any other aspect that one is interested in testing. One form of model is as a Cartesian product model, also referred to as a functional model. A Cartesian product model comprises of a set of variables (also known as "functional attributes"), their respective values (also referred to as "domains"), and restrictions on the value combinations. Restrictions exclude a portion of the cross product between the different values of the variables. Restrictions may be provided in a variety of forms such as by explicitly enumerating excluded assignments to the variables, using Boolean expressions defining when value combinations are valid or invalid, or the like. Restrictions define, with respect to a space defined by a Cartesian cross product between domains of each variable, a sub-space which comprises the legal tasks. In some cases, different restriction definitions may be equivalent and may define the same sub-space as a test-space.

BRIEF SUMMARY OF THE INVENTION

One exemplary embodiment of the disclosed subject matter is a computer-implemented method performed by a computer having a processor and memory, comprising: obtaining two or more functional models comprising variables, domains and restrictions, the two or more functional models defining a test-space comprising legal tasks; determining a difference between the test-spaces defined by the two or more functional models, wherein the difference comprises at least one task which is covered by one functional model and not the other; and displaying to a user a visual representation of the difference.

Another exemplary embodiment of the disclosed subject matter is a computerized apparatus having a processor, the processor being adapted to perform the steps of: obtaining two or more functional models comprising variables, domains and restrictions, the two or more functional models defining a test-space comprising legal tasks; determining a difference between the test-spaces defined by the two or more functional models, wherein the difference comprises at least one task which is covered by one functional model and not the other; and displaying to a user a visual representation of the difference.

Yet another exemplary embodiment of the disclosed subject matter is a computer program product embodied on a non-transitory computer readable medium retaining program instructions, which instructions when read by a processor, case the processor to performs the steps of: obtaining two or more functional models comprising variables, domains and restrictions, the two or more functional models defining a test-space comprising legal tasks; determining a difference between the test-spaces defined by the two or more functional models, wherein the difference comprises at least one task which is covered by one functional model and not the other; and displaying to a user a visual representation of the difference.

Yet another exemplary embodiment of the disclosed subject matter is a computer-implemented method performed by a computer having a processor and memory, comprising: obtaining a functional model comprising variables, domains and restrictions, the functional model defining a test-space comprising legal tasks; determining a uniform representation of the test-space by performing hole analysis on a space defined as a Cartesian cross product between possible values of the variables with respect to a sub-domain defined by the test-space, thereby determining a set of illegal holes, whereby the test-space is defined in a concise manner which is not influenced by a syntax used to define the restrictions; and outputting the uniform representation to a user.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
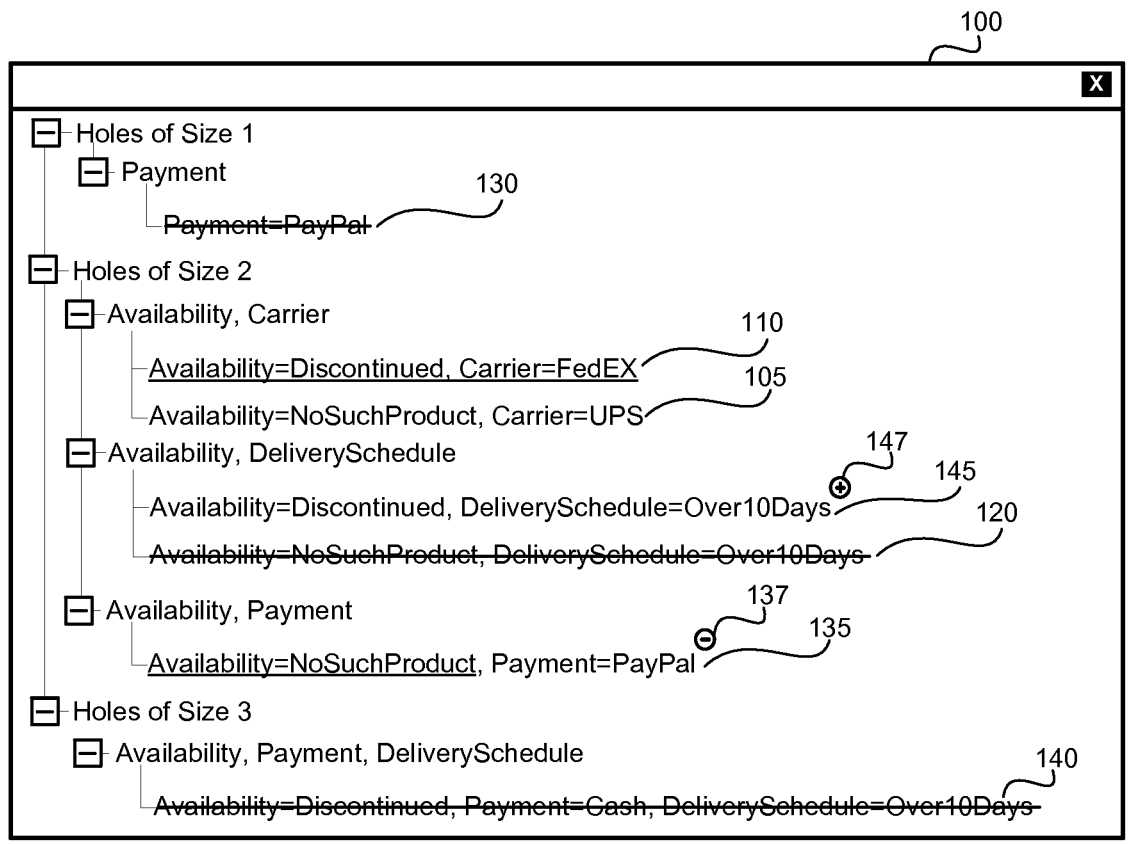
FIG. 1A-1C show graphical displays, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A "task" is an assignment of values to all attributes defined in the model. An "illegal task" is a task which is excluded from the test-space, based on the restrictions. A "legal task" is a task which is not excluded from the test-space by the restrictions. The test-space is defined by all legal tasks.

In the disclosed subject matter a functional model is said to "cover" a task if the functional model defines the task and deems the task to be a legal task. A functional model may not cover a task because the task may be defined an illegal task (i.e., restricted by one or more restrictions). Additionally or alternatively, a functional model may not cover a task because the task may be defined over different attributes and/or values. For example, the task (a=1, b=1, c=1) may not be covered by a functional model which is defined over the attributes {a,b}. As another example, the above-mentioned task may not be covered by a functional model which is defined over the attributes {a, b, c} but for which the domain of variable "a" does not include the value "1". It will be noted that the term "cover" when relating to a relation between a functional model and a task is not related to coverage analysis, and does not depend upon whether or not a task was covered by a test.

Functional models may be used in testing of various systems, such as but not limited to, computer programs, business activities, communication protocols, hardware devices, or the like. Hereinbelow an exemplary software target system is described, however it is understood that the disclosed subject matter is not limited to such a target system.

Modeling of a functional model may be a manual effort. Furthermore, the model may require maintenance over time, during software development and evolution, may be required. That is, how to maintain the software development process in an environment that is frequently changing at all levels—requirements, design, code and tests. Specifically in test planning and functional coverage analysis this may be expressed by the need to change the functional model that captures the testing problem at hand, following a change in the system under test. Another source for model changes is the fact that writing a good functional model that captures the testing problem in a complete and precise manner is an iterative learning process. That is, the initial model is usually inaccurate, and is refined following reviews and discussions with subject matter experts, and following artifact reviews (such as requirement documents and existing test plans). Once a precise model is reached, it may still need to be change over time as the system evolves.

One technical problem dealt with by the disclosed subject matter, is to enable tracking of changes in functional models. In some cases, there may be a need to understand what is the difference between different versions of a given functional model.

One technical solution is to provide a user-friendly visualization of the differences between two functional models. In some exemplary embodiments, three or more functional models may be compared, either as pairs, or in an aggregative manner. For the sake of clarity, the disclosure hereinbelow discuss comparison between two functional models, however the disclosed subject matter is not limited to such an embodiment.

Another technical solution is to automatically compare the functional models according to their respective illegal tasks. A uniform representation of the illegal tasks is automatically determined so as to overcome the challenge of having the same scope of illegal tasks be defined using different restrictions. Based on the uniform representation, comparison of the functional models may be performed and its outcome may be presented using a visual representation.

In some exemplary embodiments, the uniform representation may be based on illegal holes. In some exemplary embodiments, illegal holes may be utilized to provide for a user-friendly representation as combinations of values are generally easier for humans to compare to each other than complex Boolean expressions. An "illegal hole" is a representation of a set of illegal tasks. An illegal hole is defined by an assignment of values of some (or all) of the variables, where each task that has the same value assignment as the illegal hole is necessarily an illegal task. A hole is a minimized representation, and therefore for each subset of the value assignments, there exists at least one task which is a legal task. In other words, an illegal hole cannot be comprised in its entirety by an illegal hole that is defined using a smaller number of variables.

As an example, consider the following model: Variables $\{v_1, v_2, v_3, v_4\}$, where the domains are $D_1=\{0, 1, 2\}$, $D_2=\{0, 1\}$, $D_3=\{1\ldots 100\}$, $D_4=\{1\ldots 100\}$. A hole $(v_1=0)$ is an illegal hole if for every assignment of values to $v_2$, $v_3$, $v_4$, if $v_1$ is assigned the value 0, the task is illegal. If $(v_1=0)$ is an illegal hole, then $(v_1=0, v_3=100)$ is not an illegal hole, although all tasks which assign v1 the value 0 and v3 the value 100 are illegal. The reason $(v_1=0, v_3=100)$ is not an illegal hole is that there exists a subset of values, in particular $(v_1=0)$ which is a hole by itself.

It is well known to compute subset holes to determine coverage holes. E.g., "Hole Analysis for Functional Coverage Data", Marcus, E., Ur, S. and Ziv, A., Proceedings of Design Automation Conference (DAC), 2002, which is hereby incorporated by reference in its entirety. Subset hole analysis, also referred to as hole analysis, is a technique for finding holes in a functional model defined based on a difference between a space and a sub-space. It is known to use hole analysis to determine coverage holes by determining the holes in the sub-space defined by tasks which are covered with respect to the test-space (i.e., all legal tasks). The disclosed subject matter suggests utilizing hole analysis to characterize in a uniform manner the illegal tasks by comparing the space of the cross-product between variables and its sub-space of legal tasks, therefore the holes between the space and the sub-space are not holes in coverage but rather holes in the "legal" space of tasks.

Since only the most minimized combinations of values are considered holes, and, holes that are contained in larger ones are not reported, hole analysis may provide concise information. The holes that are the result of hole analysis may be visualized and presented to the user, e.g., using a list, a table or a tree view, or the like.

Yet another technical solution is to compare between different versions of a model according to their illegal value combinations. Based on the uniform representation of the illegal value combinations using illegal holes, differences between the functional models may be determined. The differences may be visualized using a holes view, where the combinations that became illegal and the combinations that are no longer illegal are distinguishably marked. In some exemplary embodiments, cases where illegal combinations become part of stronger/weaker illegal holes, for example due to the removal/addition of attributes to the model, are also presented in a visually compelling manner.

Yet another technical solution is to utilize Binary Decision Diagrams (BDDs) to symbolically represent the space including the legal and illegal tasks, the test-space, the set of holes, and other sets of tasks. Symbolic representation using BDDs may be more efficient than explicit representation thereof. In some exemplary embodiments, some operations, such as comparing between two BDDs may be performed in a computationally efficient manner, such as in a computational complexity of O(1).

It will be noted that a BDD may be used directly to perform calculations. For example, universal quantification of a variable may be performed, as well as existential quantification. Furthermore, Boolean operations, such as conjunction and disjunction, between functions may be performed directly using their BDDs.

It will be further noted that in the present disclosure and in the claims, the term Binary Decision Diagrams (BDDs) may refer to BDDs and variations thereof, such as for example Zero-suppressed Decision Diagrams (ZDDs), Multi-Terminal Decision Diagrams (MTDDs), Multi-Valued Decision Diagram (MDDs), and Binary Moment Diagrams (BMDs).

Generally, ZDDs are a version of BDDs where instead of introducing a node in the diagram when the result of the function is different between the 'true' and 'false' assignments to the corresponding variable, a node is introduced when the 'false' assignment to the corresponding variable results in evaluating the function to anything different than the constant 'false'. ZDDs are disclosed in A. Mishchenko, "An Introduction to Zero-Suppressed Binary Decision Diagrams", Proceedings of the 12th Symposium on the Integration of Symbolic Computation and Mechanized Reasoning, 2001, which is hereby incorporated by reference in its entirety.

Generally, MTDDs are an extension of BDDs where the function can evaluate to more than two values, i.e., have multiple terminal nodes. MTDDs are disclosed in M. Fujita et al., "Multi-Terminal Binary Decision Diagrams: An Efficient Data Structure for Matrix Representation", Formal Methods in System Design—FMSD, vol. 10, no. 2/3, pp. 149-169, 1997, which is hereby incorporated by reference in its entirety.

Generally, MDDs are a generalization of BDDs where the domains of the variables can be multi-valued. MDDs are disclosed in R. Brayton et al., "Multi-Valued Decision Diagrams Theory and Applications", Multiple-Valued Logic, 4 (1-2):9-62, 1998, which is hereby incorporated by reference in its entirety.

Generally, BMDs are a generalization of BDDs to include also domains over integers and real numbers. BMDs are disclosed in R. E. Bryant et al., "Verification of Arithmetic Circuits with Binary Moment Diagrams", Proceedings of the 32nd ACM/IEEE design automation conference, 535-541, 1995, which is hereby incorporated by reference in its entirety.

One technical effect of the disclosed subject matter is enabling a clear view of the changes that were made between versions of the model, for the purpose of tracking the changes, reviewing them and documenting them.

Another technical effect of the disclosed subject matter is performing the comparison without having to rely on syntactic similarity between the restrictions defined in each functional model.

Yet another technical effect is efficient computation of the holes and comparison thereof due to the use of BDDs.

In some exemplary embodiments, changes to the functional model can include addition/removal/rename of attributes and of values, and adding/changing/removing restrictions.

Changes in attributes and values can be listed. Rename of an attribute or value can be automatically detected, or provided by a user. Based on the modifications in the names of attributes and of values, a mapping may be determined to map between renamed attributes and values. In some exemplary embodiments, when mapping is not available, a renaming may cause removal of holes (using the "old" name) and addition of holes (using the "new" name).

In some exemplary embodiments, changes in attributes and values affect the illegal holes. As an example, consider a restriction which excludes all tasks in which $a \neq 1 \wedge b=5$. Adding a new value 4 to the domain of the variable a, introduces a new illegal hole (a=4, b=5).

In some exemplary embodiments, there may be a technical challenge in comparing versions of a model is when restrictions are modified. Restrictions can be stated as Boolean expressions and there are many ways to capture the same illegal combinations using restrictions. By simply viewing the different lists of restrictions it is hard to deduce how the changes in the restrictions affected the illegal combinations of a model compared to a previous version of the model.

In some exemplary embodiments, a uniform and user-friendly representation of the illegal value combinations may be reached. This representation may serve as a basis for comparison between different versions. In some exemplary embodiments, this uniform representation has value of its own, regardless of comparing versions of the model, since it is an orthogonal view of the model and can be used for review even of a single version of the model. In some exemplary embodiments, the uniform representation may be achieved by treating all the legal tasks as covered tasks, and running subset hole analysis to detect the holes of this trace with respect to the model, excluding the restriction thereof. Each determined hole is in fact a concise representation of an illegal combination that is excluded by restrictions. In some exemplary embodiments, this representation is minimal because any subset of this combination (value combination of a subset of the attributes) is legal. In some exemplary embodiments, the list of holes that is detected by hole analysis is the uniform representation of the illegal value combinations.

In some exemplary embodiments, hole analysis is configured to detect holes up to a given size. In this case, subset holes analysis may be performed until the list of detected holes captures exactly the set of illegal tasks. Such comparison may be performed efficiently using symbolic representations, such as BDDs.

Usage of BDDs in representing functional models is disclosed in U.S. non-provisional application Ser. No. 13/360, 811 filed on Jan. 30, 2012 to Tzoref-Brill et al., and in U.S. non-provisional application Ser. No. 13/163,700 filed Jun.

19, 2011 to Tzoref-Brill et al., which are both hereby incorporated by reference in their entirety (hereinafter, both, Tzoref-Brill).

It will be noted that there may be a large number of tasks, as the space is a Cartesian cross product which is exponential in the number of variables and values thereof. As an example, there may be many billions of tasks, including many billions of legal tasks. The set of legal tasks may be concisely represented symbolically using a BDD and hole analysis may be applied directly on this BDD to retrieve the list of holes. In some exemplary embodiments, the holes are also represented symbolically using BDDs. To detect when the list of holes captures exactly all illegal tasks of the model, after producing the holes for a given size, the new holes are conjuncted with the old ones (preferably, efficiently by manipulating BDDs), and the BDD of total holes found so far is then compared to the BDD of the illegal tasks, that was built directly from the user-given restrictions. Comparison between BDDs can be done in O(1), assuming the same variable order, and thus can be considered efficient. The result of the hole analysis is the same for the same attributes and values (or one-to-one mapping between attributes and values) and restrictions, regardless of the format of the restrictions (but as long as they exclude exactly the same illegal combinations). Therefore this presentation can be considered as uniform.

In some exemplary embodiments, after hole analysis is performed for different versions of the model, the holes of the different versions are compared. When comparing a newer version of the model to an older version, illegal holes may remain exactly the same, be added or be removed. The difference in the illegal holes can be visualized by two or more views next to each other, or alternatively by a single view that captures all possible changes.

Referring now to FIG. 1A showing a display, in accordance with some exemplary embodiments of the disclosed subject matter. Display 100 may be a visual and/or graphical representation of the test-space defined by a functional model and the difference from another functional model, such as a preceding version. The representation may be provided using illegal holes defined by the test-space with respect to the cross-product of the variable given their respective domains.

Display 100 shows all holes of a functional model and provides visual indications to a difference from a second model. For the ease of the disclosure the two models are referred to as a current version and a last version, however any two models may be compared. A "tree-view" of holes of different sizes is shown. For each hole-size (e.g., holes of size 2), all illegal holes of that size is shown. The illegal holes are defined by an assignment of values to a subset of variables. The size of the hole is the number of variables in the subset.

Illegal hole 105 indicates that all tasks in which Availability is "NoSuchProduct" and Carrier is "UPS" are illegal tasks. Based on the visual representation thereof, it may be determined that Illegal hole 105 is an illegal hole in both compared models. In some exemplary embodiments, a color, a font, or other visual cue may be used to indicate that an illegal hole from the last version remains the same in the current version.

Illegal hole 110 is indicated to have been added with respect to the last version. A visual indication, such as an underline, a color, a font, or other visual cue may be utilized to provide such indication.

Illegal hole 120 is indicated to have existed in the last version and removed in the current version. A visual indication, such as a strikethrough, a color, a font, or other visual cue may be utilized to provide such indication.

Illegal hole 130 is a hole of size 1 which has existed in the last version. Illegal hole 130 was refined so that there are legal tasks in which Payment variable is set to "PayPal", however, the illegal hole is "weakened" in the sense that it is replaced by a new illegal hole, which comprises a smaller number of illegal tasks. The weaker hole, hole 135, is indicated to have been added. In some exemplary embodiments, the indication that the newly added hole is a weaker version of a hole in the last version may be provided using an icon, such as 137. Additionally or alternatively, a portion of the hole which was added to refine the illegal hole may be indicated using some form of visual representation. As an example only, the portion of the hole which relates to the Availability variable, which was not present in the hole 130 of the last version, may be underlined. It will be noted that in some exemplary embodiments, several weaker holes may be introduced when refining a hole.

Similarly, a hole may be "strengthen" by increasing its scope. Illegal hole 140, of size 3, may have existed in the last version. In the current version, hole 140 may become a stronger hole—hole 145, of size 2. The stronger hole may be indicated as such using an icon 147. Additionally or alternatively, a visual indication may be provided to indicate that hole 145 is a stronger version of a hole in a previous version.

In some exemplary embodiments, a hole which becomes stronger or weaker may be indicated as deleted in a certain manner which distinguishes such deletion from complete deletions of a hole (e.g., visual indication relating to hole 120 and holes 130, 140 may be different).

In some exemplary embodiments, it may be a computational challenge to compute all illegal holes of a test-space. To avoid computational intensive activity, all holes of up to a predetermined size, such as four, may be computed and used in accordance with the disclosed subject matter. In such cases, display 100 may indicate that not all holes were computed.

Figures 1B, 1C:
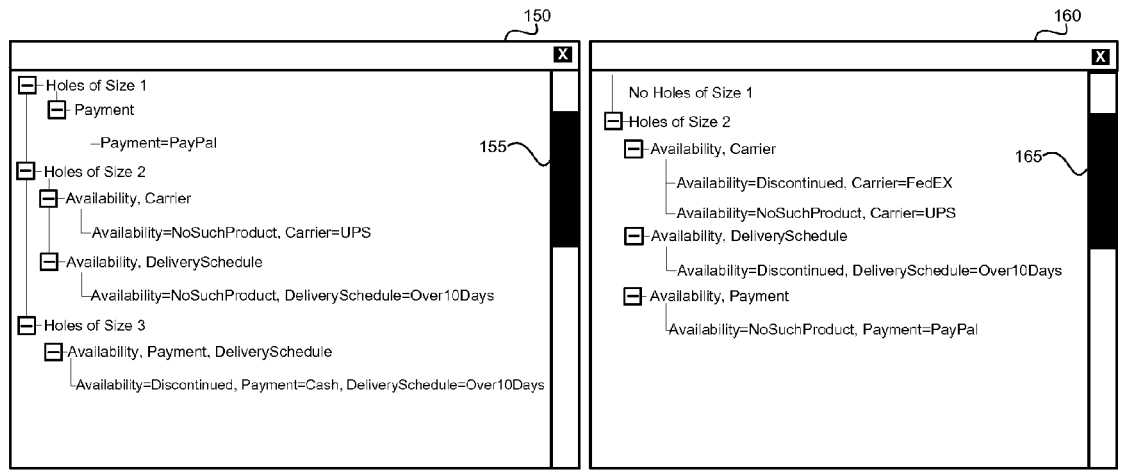

Referring now to FIGS. 1B and 1C showing alternative displays, in accordance with some exemplary embodiments of the disclosed subject matter. Display 150 may display the last version, based on a uniform representation thereof, whereas display 160 may display the current version. In some exemplary embodiments, displays 150, 160 may be displayed side-by-side so as to allow a user to note differences between the versions of the model. In some exemplary embodiments, scrollbars 155 and 165 may be correlated. Correlated scrollbars may cause scrolling in both displays so as to provide an aligned view of both versions of the model.

Figure 2A:
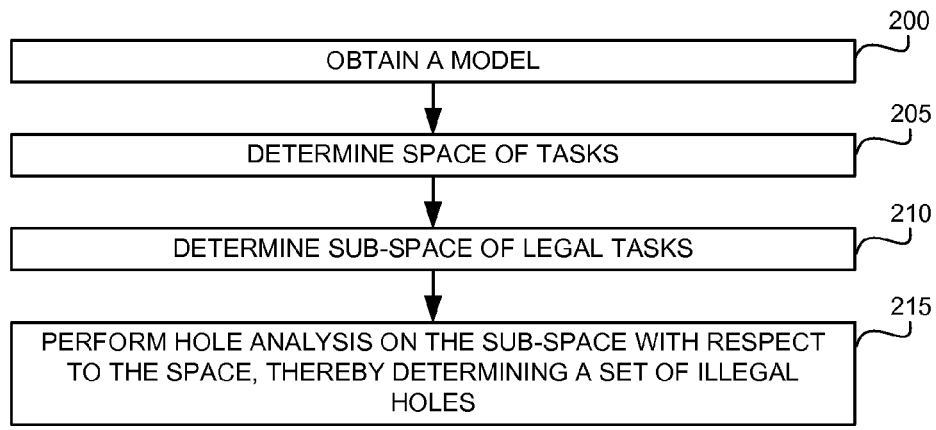
FIG. 2A shows a flowchart diagram of a method of determining a uniform representation of a test-space, in accordance with some exemplary embodiments of the disclosed subject matter.

Referring now to FIG. 2A showing a flowchart diagram of a method of determining a uniform representation of a test-space, in accordance with some exemplary embodiments of the disclosed subject matter.

In Step 200, a model may be obtained. The model may be obtained in a digital and/or computer-readable form. In some exemplary embodiments, the model may be obtained from a file, from a network, manually provided by a user, or the like.

In Step 205, a space of tasks may be defined based on the variables of the model and their respective domains. In some exemplary embodiments, the space may be defined as a Cartesian cross product between the different value assignments of each variable of the model.

In Step 210, a sub-space of legal tasks may be defined by excluding from the space all tasks which are considered illegal by the restrictions of the model.

In Step 215, hole-analysis may be performed on the sub-space with respect to the space, thereby determining a set of illegal holes defining the test-space in a concise manner which is independent of the manner in which the restrictions were defined (e.g., explicit enumeration of illegal tasks, Boolean formulas defining restricted combinations, alternative Boolean formula defining the same restricted combinations differently, or the like).

Figure 2B:
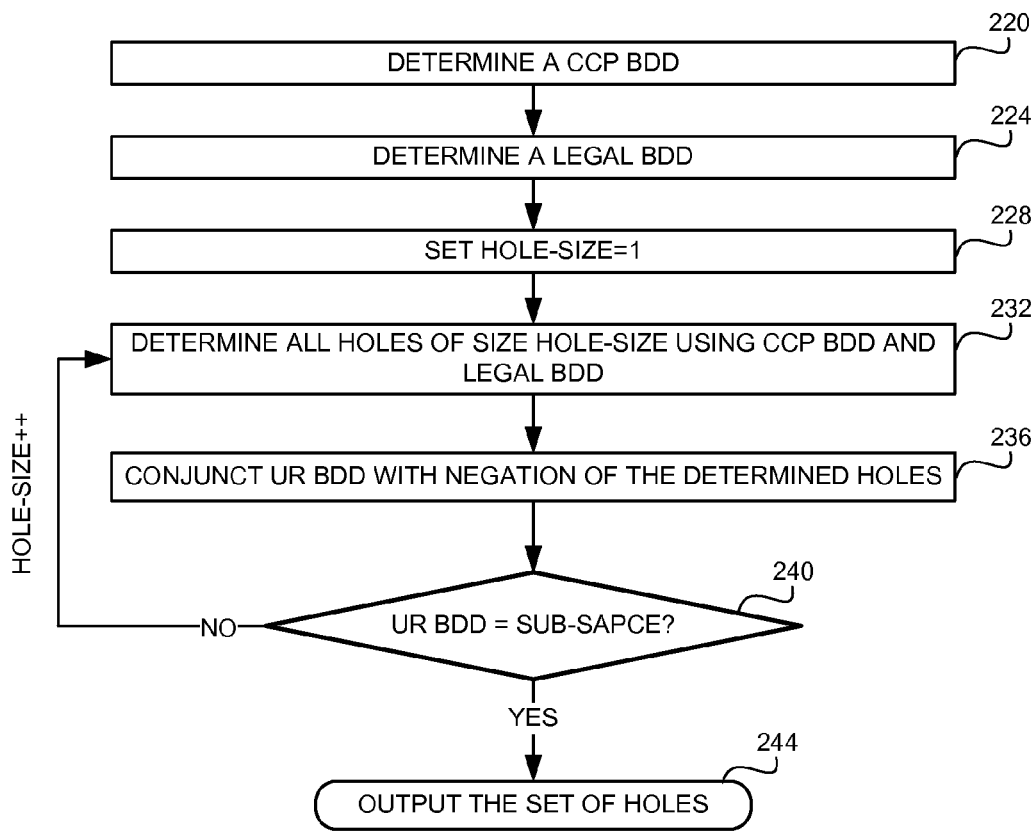
FIG. 2B shows a flowchart diagram of a method of determining a set of illegal holes using BDD manipulation, in accordance with some exemplary embodiments of the disclosed subject matter.

Referring now to FIG. 2B showing a flowchart diagram of a method of determining a set of illegal holes using BDD manipulation, in accordance with some exemplary embodiments of the disclosed subject matter.

In Step 220, a Cartesian Cross Product BDD (CCP BDD) may be determined. CCP BDD may represent the space of tasks, including both legal and illegal tasks. The CCP BDD may define the space of tasks. In some exemplary embodiments, the CCP BDD may be the BDD "true". Additionally or alternatively, some portions of BDD "true" may be excluded, such as the case when MDDs are used and some assignments of the MDD do not correspond to a value in accordance with the domain.

In Step 224, a legal BDD may be determined. The legal BDD may define the sub-space of legal tasks. The legal BDD may be computed by determining for each restriction a BDD and conjuncting negations of the restriction BDDs to exclude from the CCP BDD all illegal tasks. In some exemplary embodiments, a difference between CCP BDD and the legal BDD may be the illegal BDD. The illegal BDD may be determined by computing CCP BDD $\wedge \neg$ legal BDD.

In Step 228, an initial hole size of one (e.g., the largest possible hole containing only an assignment to one variable) may be determined.

In Steps 232-240, holes of increasing sizes may be determined until the entire illegal space is defined using the determined holes.

In Step 232, all holes of size hole-size may be determined. The holes may be determined by manipulating the BDDs of CCP BDD and legal BDD. One embodiment of BDD manipulation to determine holes is described in Tzoref-Brill.

In Step 236, a Uniform Representation BDD (UR BDD) is manipulated using BDDs of the determined holes, to represent the sub-space of all tasks which are not contained by the illegal holes. The UR BDD may initially be the CCP BDD from which determined holes are excluded. Exclusion may be performed by computing a conjunction between UR BDD and a negation of the determined holes.

In Step 240, a comparison between the UR BDD and the sub-space may be performed to determine whether all holes were determined. In case the two BDDs are not equivalent, holes-size may be increased by one and steps 232-240 may be performed once more. In case the two BDDs are equivalent, the set of holes may be outputted in Step 244, such as by providing to a user a visual representation thereof (e.g., FIG. 1B).

In some exemplary embodiments, loop 232-240 may be stopped based on a stopping criterion such as a maximal size of hole (e.g., five), an indication of resources exhaustion, or the like.

It will be understood that in some exemplary embodiments, an illegal tasks BDD may be computed based on the restrictions and the legal tasks BDD may be computed based thereon.

It will be further noted that in some exemplary embodiments, a complementary BDD to the UR BDD may be computed instead thereof, such as by initially assigning the value "false" and disjuncting each determined hole with the BDD, thereby the BDD may represent all illegal tasks comprised by the illegal holes and may be used to determine whether all holes were identified, such as by comparing the BDD with an is illegal tasks BDD.

Figure 2C:
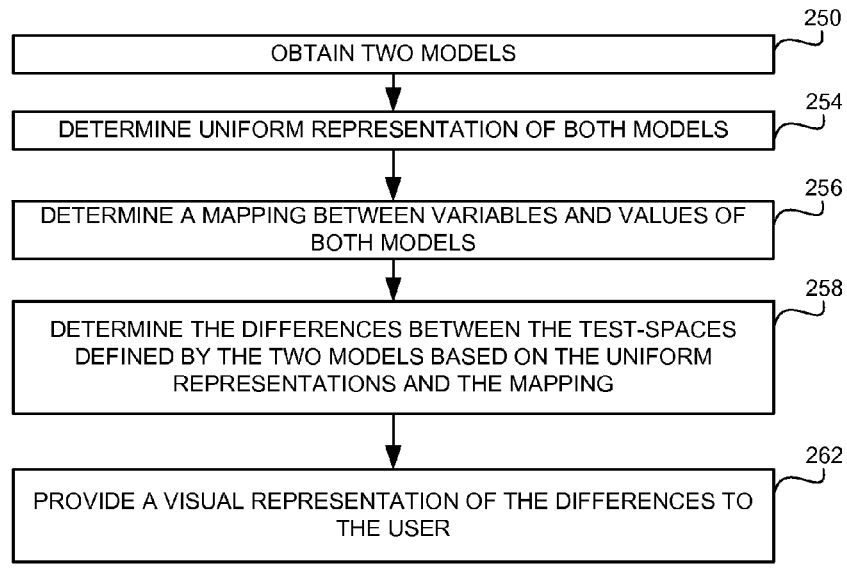
FIG. 2C shows a flowchart diagram of a method to process two functional models, in accordance with some exemplary embodiments of the disclosed subject matter.
Figure 3:
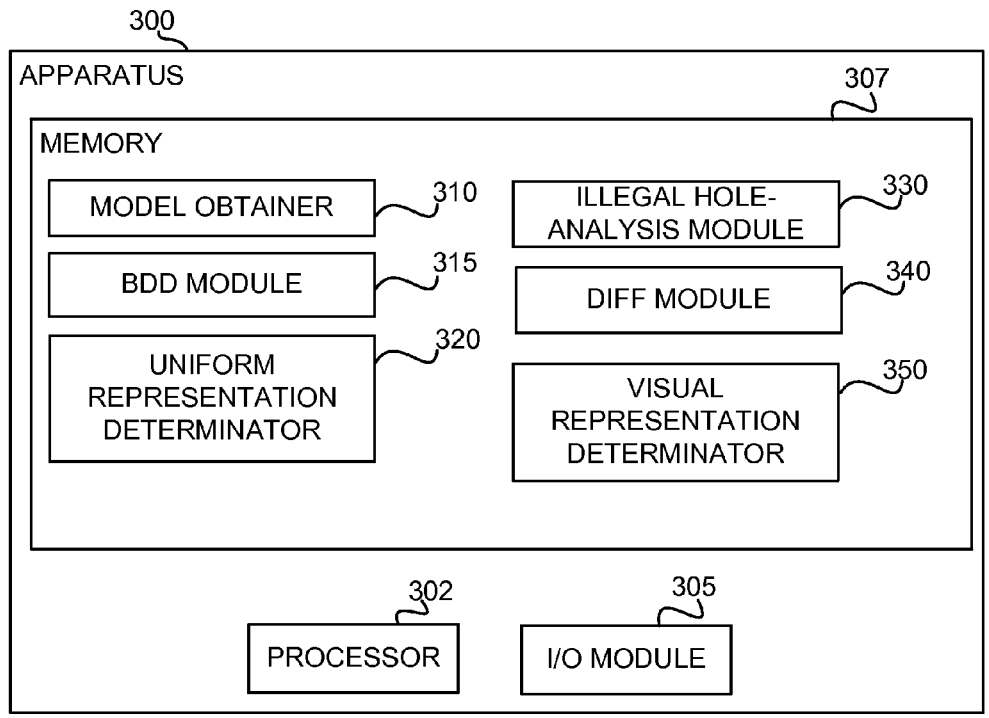
FIG. 3 shows a block diagram of an apparatus, in accordance with some exemplary embodiments of the disclosed subject matter.

Referring now to FIG. 2C showing a flowchart diagram of a method to process two functional models, in accordance with some exemplary embodiments of the disclosed subject matter.

In Step 250, two models are obtained, such as a last version and a current version relating to a single System Under Test (SUT).

In Step 254, a uniform representation, such as illegal-holes-based, may be determined for each model.

In Step 256, mapping between variables of the models may be determined. Additionally or alternatively, mapping between values of the variables of the models may be determined. The mapping may indicate a variable renaming thereby enabling the disclosed subject matter to avoid indicating removal of holes associated with the variable's old name and the addition of holes associated with the variable's new name. The mapping may be determined automatically, semi-automatically based on user input, or manually by a user.

In Step 258, a difference between the test-spaces defined by the two models may be determined. The difference may be determined based on the uniform representation and the mapping. In some exemplary embodiments, the difference may be a list of holes which were removed and/or added in the current version with respect to the last version. Additionally or alternatively, the difference may include a list of holes that are weaker or stronger in the current version than in the last version. In some exemplary embodiments, holes of different versions may be correlated with one another based on the mapping determined in Step 256.

In Step 262, a visual representation of the differences may be provided to the user. The visual representation may allow the user to comprehend the differences between the two versions, to identify whether the modeling is correct, whether bugs were introduced to the model, or the like. The visual representation may be provided in a printout, using a Graphical User Interface (GUI), using a display such as FIG. 1A and/or FIGS. 1B-1C.

Referring now to FIG. 2C showing an apparatus in accordance with some exemplary embodiments of the disclosed subject matter.

In some exemplary embodiments, an Apparatus 300 may comprise a Processor 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents. Processor 302 may be configured to execute computer-programs useful in performing any of the methods of FIGS. 2A-2C.

In some exemplary embodiments of the disclosed subject matter, Apparatus 300 may comprise an Input/Output (I/O) Module 305. I/O Module 305 may be utilized to provide an output to and receive input from a user. I/O Module 305 may be operative to provide an error report to a user, such as a model designer, a QA staff member, a verification engineer, or the like.

In some exemplary embodiments, Apparatus 300 may comprise a Memory Unit 307. Memory Unit 307 may be a short-term storage device or long-term storage device. Memory Unit 307 may be a persistent storage or volatile storage. Memory Unit 307 may be a disk drive, a Flash disk, a Random Access Memory (RAM), a memory chip, or the like. In some exemplary embodiments, Memory Unit 307 may retain program code operative to cause Processor 302 to perform acts associated with any of the subcomponents of Apparatus 300. In some exemplary embodiments, Memory Unit 307 may retain program code operative to cause Processor 302 to perform acts associated with any of the steps shown in FIGS. 2A-2C above.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

A Model Obtainer 310 may be configured to obtain one or more models, such as disclosed in Steps 200 and 250.

A BDD Module 315 may be configured to compute and determine BDDs. BDD Module 315 may be configured to manipulate BDDs in a relatively efficient manner. In some exemplary embodiments, BDD Module 315 may enforce an order on the BDD variables of all BDDs thereby enabling efficient comparison between different BDDs to determine whether or not the BDDs are equivalent.

A Uniform Representation Determinator (URD) 320 may be configured to determine a representation to a model which is uniform and independent of the manner in which restrictions are defined by the model. URD 320 may determine a set of illegal holes defining the test-space. The set of holes may be a concise and uniform representation of a model.

In some exemplary embodiments, an Illegal Hole Analysis Module 330 may be configured to determine a set of illegal holes defining a difference between a space of tasks and a sub-space of legal tasks. Illegal Hole Analysis Module 330 may be utilized by URD 320 to determine the uniform representation. In some exemplary embodiments, Illegal Hole Analysis Module 330 may be configured to utilize BDD Module 315 to perform BDD manipulation thereby computing the illegal holes in a relatively efficient manner and avoiding representing explicitly large sets of tasks, which may require substantial memory resources, which may not be available to Apparatus 300.

A Diff Module 340 may be configured to determine differences between models based on their uniform representation. In some exemplary embodiments, Diff Module 340 may be configured to identify added illegal holes, removed illegal holes, illegal holes which got stronger or weaker, and the like.

A Visual Representation Determinator 350 may determine and provide to a user of Apparatus 300 a visual representation of a model, based on its uniform representation. Additionally or alternatively, Visual Representation Determinator 350 may be configured to provide a visual representation of differences between a first model and a second model.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a computer having a processor and memory, comprising:
   obtaining two or more functional models comprising variables, domains and restrictions, the two or more functional models defining a test-space comprising legal tasks;
   determining a difference between the test-spaces defined by the two or more functional models, wherein the difference comprises at least one task which is covered by one functional model and not the other; and
   displaying to a user a visual representation of the difference.

2. The computer-implemented method of claim 1, wherein said determining the difference comprises:
   for each of the two or more functional models, determining a representation of illegal tasks defined by the functional model in accordance with a uniform representation; and
   comparing the representations of the two or more functional models.

3. The computer-implemented method of claim 2, wherein said determining the representation of a functional model in accordance with the uniform representation comprises:
   performing hole-analysis on a space defined by the variables and the domains of the functional model with respect to a sub-space comprising the test-space defined by the functional model, thereby determining a set of illegal holes.

4. The computer-implemented method of claim 3, wherein an illegal hole is a concise representation of a set of illegal tasks.

5. The computer-implemented method of claim 3, wherein an illegal hole is defined by a combination of values to different functional attributes which is excluded by the restrictions, and wherein any subset of the combination is not necessarily excluded by the restrictions.

6. The computer-implemented method of claim 3, wherein said performing hole-analysis comprises:
   defining a first Binary Decision Diagram (BDD) to represent a set of all tasks, thereby the first BDD represents the space;
   defining a second BDD to represent a set of all legal tasks, thereby the second BDD represents the test-space; and
   performing hole-analysis using the first and second BDDs to produce a BDD representing the set of illegal holes.

7. The computer-implemented method of claim 6, wherein said comparing comprises comparing between BDDs of illegal holes associated with the two or more functional models.

8. The computer-implemented method of claim 6, wherein said performing hole-analysis using the first and second BDDs comprises:
   determining an illegal tasks BDD based on the first and second BDDs;
   repeatedly:
      determining all illegal holes of an increasing size in the first BDD based on the second BDD; and
      adding determined illegal holes to the BDD representing the set of illegal holes; and
   wherein said repeatedly determining is stopped in response to a determination that the BDD representing the set of illegal holes is equivalent to the illegal tasks BDD.

9. The computer-implemented method of claim 1, wherein the visual representation is configured to show illegal holes of a first functional model and provide an indication for:
   illegal holes that remain the same with respect to a second functional model of the two or more functional model;
   illegal holes that are present in the first functional model and are not present in the second functional model; and
   illegal holes that are present in the second functional model and are not present in the first functional model.

10. The computer-implemented method of claim 9, wherein the visual representation is configured to provide indication for an illegal hole becomes either stronger or weaker in the functional model with respect to the second functional model.

11. The computer-implemented method of claim 1, wherein said determining is based on a mapping between items of the two or more functional models, wherein the items are selected from the group consisting of variables and values.

12. The computer-implemented method of claim 1, wherein the two or more functional models are refinements of one another which are manually developed for the purpose of testing a computer system.

13. The computer-implemented method of claim 12, wherein the computer system is a software program code executable by a computer.

14. A computerized apparatus having a processor, the processor being adapted to perform the steps of:
   obtaining two or more functional models comprising variables, domains and restrictions, the two or more functional models defining a test-space comprising legal tasks;
   determining a difference between the test-spaces defined by the two or more functional models, wherein the difference comprises at least one task which is covered by one functional model and not the other; and
   displaying to a user a visual representation of the difference.

15. The computerized apparatus of claim 14, wherein determining the difference comprises:
   for each of the two or more functional models, determining a representation of illegal tasks defined by the functional model in accordance with a uniform representation; and
   comparing the representations of the two or more functional models.

16. The computerized apparatus of claim 15, wherein determining the representation of a functional model in accordance with the uniform representation comprises:
   performing hole-analysis on a space defined by the variables and the domains of the functional model with respect to a sub-space comprising the test-space defined by the functional model, thereby determining a set of illegal holes.

17. The computerized apparatus of claim 16, wherein an illegal hole is defined by a combination of values to different functional attributes which is excluded by the restrictions, and wherein any subset of the combination is not necessarily excluded by the restrictions.

18. The computerized apparatus of claim 16, wherein performing hole-analysis comprises:
    defining a first Binary Decision Diagram (BDD) to represent a set of all tasks, thereby the first BDD represents the space;
    defining a second BDD to represent a set of all legal tasks, thereby the second BDD represents the test-space; and
    performing hole-analysis using the first and second BDDs to produce a BDD representing the set of illegal holes.

19. The computerized apparatus of claim 14, wherein the visual representation is configured to show illegal holes of a first functional model and provide an indication for:
    illegal holes that remain the same with respect to a second functional model of the two or more functional model;
    illegal holes that are present in the first functional model and are not present in the second functional model; and
    illegal holes that are present in the second functional model and are not present in the first functional model.

20. The computerized apparatus of claim 14, wherein the visual representation is configured to provide indication for an illegal hole becomes either stronger or weaker in the functional model with respect to the second functional model.

21. A computer program product embodied on a non-transitory computer readable medium retaining program instructions, which instructions when read by a processor, case the processor to performs the steps of:
    obtaining two or more functional models comprising variables, domains and restrictions, the two or more functional models defining a test-space comprising legal tasks;
    determining a difference between the test-spaces defined by the two or more functional models, wherein the difference comprises at least one task which is covered by one functional model and not the other; and
    displaying to a user a visual representation of the difference.

22. The computer program product of claim 21, wherein determining the difference comprises:
    for each of the two or more functional models, determining a representation of illegal tasks defined by the functional model in accordance with a uniform representation; and
    comparing the representations of the two or more functional models.

23. The computer program product of claim 22, wherein determining the representation of a functional model in accordance with the uniform representation comprises:
    performing hole-analysis on a space defined by the variables and the domains of the functional model with respect to a sub-space comprising the test-space defined by the functional model, thereby determining a set of illegal holes.

24. A computer-implemented method performed by a computer having a processor and memory, comprising:
    obtaining a functional model comprising variables, domains and restrictions, the functional model defining a test-space comprising legal tasks;
    determining a uniform representation of the test-space by performing hole analysis on a space defined as a Cartesian cross product between possible values of the variables with respect to a sub-domain defined by the test-space, thereby determining a set of illegal holes, whereby the test-space is defined in a concise manner which is not influenced by a syntax used to define the restrictions; and
    outputting the uniform representation to a user.

* * * * *